United States Patent
Fleischer

(10) Patent No.: US 6,340,263 B1
(45) Date of Patent: Jan. 22, 2002

(54) FASTENING OF A TUBE PLATE

(75) Inventor: Claus Fleischer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/509,094

(22) PCT Filed: Jul. 10, 1999

(86) PCT No.: PCT/DE99/02137

§ 371 Date: Mar. 21, 2000

§ 102(e) Date: Mar. 21, 2000

(87) PCT Pub. No.: WO00/05109

PCT Pub. Date: Feb. 3, 2000

(30) Foreign Application Priority Data

Jul. 23, 1998 (DE) .......................................... 198 33 158

(51) Int. Cl.$^7$ ................................................. F16D 1/12
(52) U.S. Cl. ....................... 403/151; 403/150; 403/154; 403/161; 15/250.3
(58) Field of Search ................................. 403/150, 154, 403/155, 157, 158, 161, 187, 188, 192, 193, 201, 220, 225, 388, 408.1; 15/250.3, 250.31; 267/141; 411/508, 60, 15

(56) References Cited

U.S. PATENT DOCUMENTS

| | | | | |
|---|---|---|---|---|
| 3,352,195 A | * | 11/1967 | Fisher | 411/15 |
| 4,240,323 A | * | 12/1980 | Kojima | 411/15 |
| 4,515,496 A | * | 5/1985 | McKay | 403/388 |
| 4,579,492 A | * | 4/1986 | Kazino et al. | 411/60 |
| 4,760,495 A | * | 7/1988 | Till | 411/508 |
| 5,222,706 A | * | 6/1993 | Hoshino | 15/250.31 |
| 5,441,227 A | * | 8/1995 | Hayashi | 15/250.31 |
| 5,609,329 A | * | 3/1997 | Scholl | 267/141 |
| 5,738,476 A | * | 4/1998 | Assimakopoulos | 411/508 |
| 5,960,512 A | * | 10/1999 | Schael et al. | 15/250.31 |

FOREIGN PATENT DOCUMENTS

| | | |
|---|---|---|
| DE | 74 34 119 | 2/1975 |
| DE | 29 20 899 C2 | 1/1988 |
| DE | 196 42 666 A1 | 10/1997 |

* cited by examiner

*Primary Examiner*—Lynne H. Browne
*Assistant Examiner*—Doug Hutton
(74) *Attorney, Agent, or Firm*—Michael J. Striker

(57) ABSTRACT

A fastening of a tube mounting (10) for a wiper system on a vehicle body has at least one fastening bore (58), extending transversely through a mounting tube (12), into which bore a rubber-elastic coupling element (42) with a hole (56) for a screw is inserted. The contour of the coupling element (42) conforms to the internal contour of the mounting tube (12) in the region of the fastening bore (58), protrudes through openings (60) in the fastening bore (58) by a projecting length (44) and, on the inside, covers the openings (60) axially on both ends.

7 Claims, 2 Drawing Sheets

FASTENING OF A TUBE PLATE

PRIOR ART

The invention relates to a fastening of a tube mounting.

Motor vehicle wiper systems are fastened to the body of a motor vehicle by a wiper carrier, also called a mounting or tube mounting—if the wiper carrier is also made up of tubes. The mounting as a rule includes a motor mounting, which carries a wiper drive with a wiper motor and a gear mounted on the motor. A power takeoff shaft of the gear is supported in a gear dome and, as a rule via a crank and link rods, it drives cranks that are solidly connected to a drive shaft for every wiper. The drive shafts of the wipers are supported in wiper bearings, whose bearing housings are secured or formed onto the ends of the mounting. The mounting is secured to the vehicle body via the bearing housings, or via fastening eyes that are formed onto the bearing housing, mounting, and/or motor mounting. To prevent vibration from being transmitted from the mounting to the body, coupling elements are disposed between the mounting and the body. As a rule, the mountings are assembled from many components. This means numerous interfaces, with attendant tolerances. Besides, there are the coupling elements, which are sometimes shipped loose.

From German Utility Model DE-GM 74 34 119, a tube mounting is known that is made from a square tube, to which a plate acting as a motor mounting is welded. One wiper bearing is affixed to each of the ends of the square tubes. Such tube mountings or tubular frame systems are quite stable, despite their lightweight mode of construction. For cost reasons, a straight carrier tube, which requires no prebending operation, is desirable.

From German Patent DE 29 20 899 C2, a tube mounting is known in which tube stubs with suitable attachments are inserted into the hollow profile of the mounting tube. The attachments rest at least in part on the walls of the mounting tube and have at least one recess, into which portions of the mounting tube are pressed in order to make a positive connection between the mounting tube and the tube stub. Wiper bearings are disposed in the tube stubs. Compared with screw connections, the number of parts is reduced, but the joining process still requires numerous prefabricated individual parts with many production steps. This makes stock keeping and logistics more expensive. Furthermore, despite the recesses, the bulky attachments have a considerable weight.

It has already been proposed in an earlier German Patent Application, DE 196 42 666.9, to form tube stubs for wiper bearings onto a tube mounting that is made by an internal high-pressure process, and into the tube stubs to insert one-piece or split two-piece bearing bushes of plastic or metal. In an extension of the mounting tube past the wiper bearings, the mounting tube has fastening eyes, which are formed onto the mounting tube by a pressing operation. The tube mounting is secured to the vehicle body using coupling elements.

SUMMARY OF THE INVENTION

According to the invention, the coupling element is adapted to the internal contour of the mounting tube in the region of the fastening bore. It protrudes through openings of the fastening bore with a projecting length and on the inside overlaps the opening axially to both sides. The fastening bore can be disposed in a transverse plane of the mounting tube at an arbitrary angular position. As a result, even fastening points that are not located in the direction of a wiper bearing can easily be detected on the vehicle body.

Only one coupling element, which has a large damping volume, is needed per fastening point. The damping volume is predominantly located in the mounting tube and is thus protected against environmental factors, aging and damage. The part protruding from the mounting tube can be limited to a minimum, resulting in a reduced external structural height. Because of the projecting length and the overlap, the coupling element is secured axially and radially by positive engagement. If an overlap in the axial direction of 1 mm to 2 mm is selected, the coupling element, given a suitable hardness of approximately 30 to 60 Shore A, can be installed through the openings of the fastening bore, and the installation can also be done automatically. If the end of the mounting tube is open, then installation in the axial direction of the mounting tube is also possible, if the projecting length of the coupling element and the hardness are suitably matched. However, the wall thickness of the coupling element should not be any less than 2 mm. As a result of the coupling element of the invention, the number of parts is also reduced, and both installation and stock keeping are made easier.

Since the coupling element conforms well to the mounting tube, forces are transmitted well and vibration from intensive friction is greatly damped. Nor is there any need to fear that the coupling element will be sheared off by the pressure of the fastening screws. To limit the tension forces of the fastening screws on the coupling element, it is expedient to insert a spacer bush with a screw hole into the coupling element. After a predetermined tension travel, the spacer bush comes into contact on its face end and transmits the screw forces that exceed the initial tension. Between both the screw bolt and the coupling element and the spacer bush, there is a shim, which overlaps the coupling element on the face end that protrudes out of the mounting tube and also overlaps the opening of the fastening bore. Thus the tube mounting itself is held securely even if the coupling element should become nonfunctional from becoming brittle, aging, or being damaged. The shim can also be formed onto the spacer bush integrally in the form of a collar.

BRIEF DESCRIPTION OF DRAWINGS

Further advantages will become apparent from the ensuing drawing description. In the drawing, exemplary embodiments of the invention are shown. The drawing, description and claims include numerous characteristics in combination. One skilled in the art will expediently consider the characteristics individually as well and combine them into useful combinations.

Shown are.

DESCRIPTION OF THE EXEMPLARY EMBODIMENTS

Figure 1:
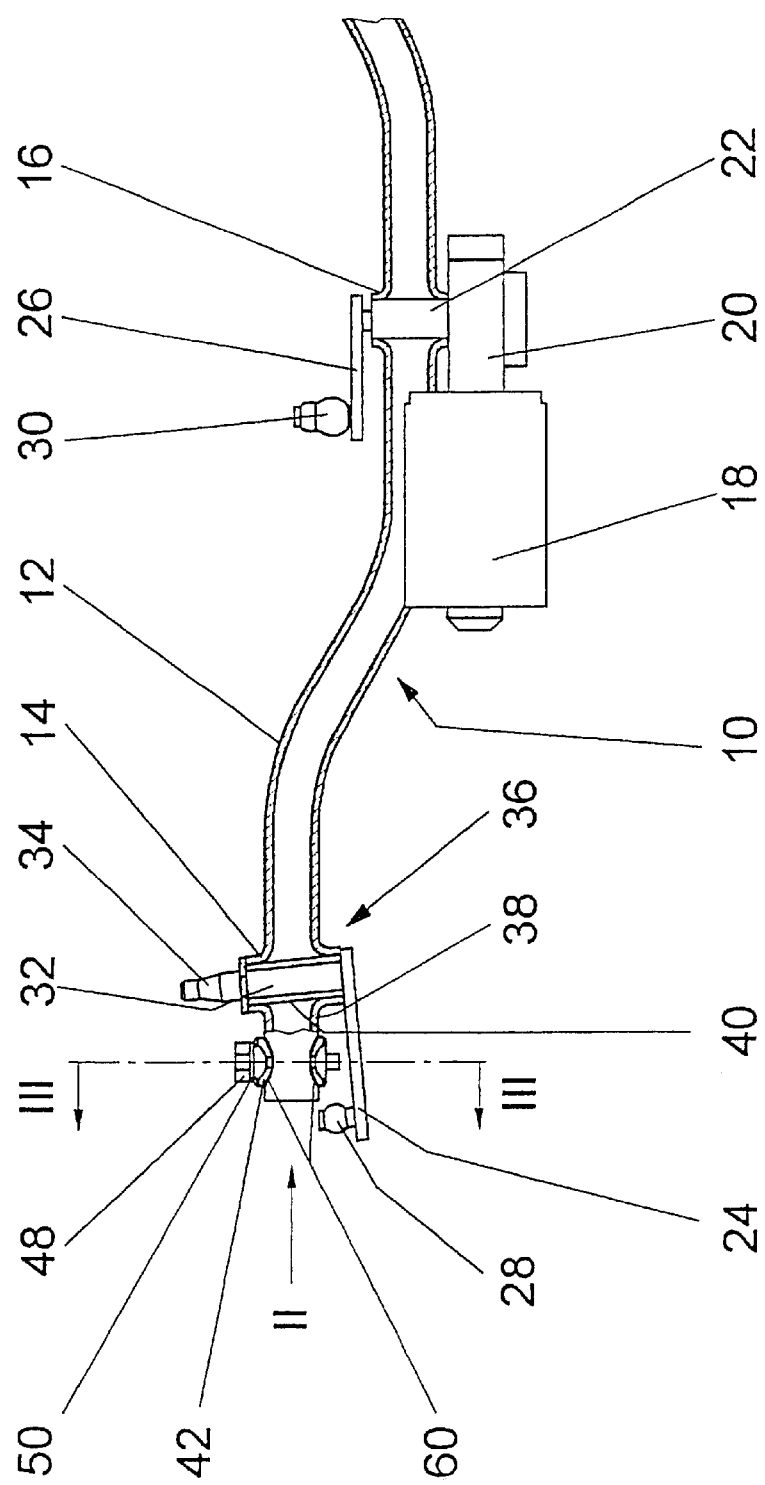
FIG. 1, a schematic fragmentary longitudinal section through a tube mounting.
Figure 2:
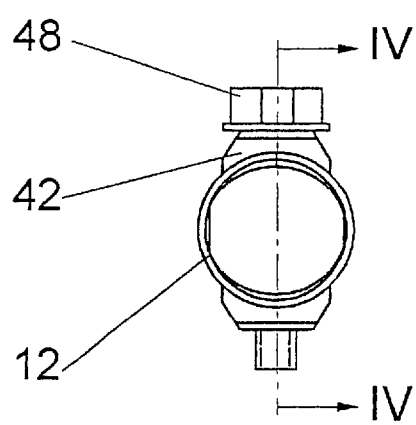
FIG. 2, a view in the direction of an arrow II in FIG. 1 without a wiper bearing.
Figure 3:
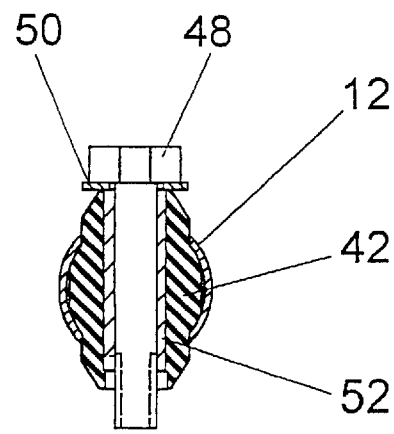
FIG. 3, a cross section taken along the line III—III of FIG. 1.

One essential component of a tube mounting 10 is a mounting tube 12, which has been shaped from a tubular blank in an internal high-pressure process. The mounting tube 12 comprises generally suitable metal materials, in particular steel with or without surface coating, or special steel. It has formed-on tube stubs 14 and 16. A wiper drive comprising a wiper motor 18 and a gear 20 is retained in the tube stub 16 by means of a gear dome 22 provided on the housing of the gear 20. A power takeoff shaft is supported in the gear dome 22 with a crank 26 whose ball peg 30 is connected via rods, not shown, to ball pegs 28 on cranks 24 that are solidly connected to drive shaft 32. The drive shafts 32 have wipers, not shown in further detail, on their ends 34 and are supported in wiper bearings 36 on the ends of the mounting tube 12. The wiper bearing 36 essentially includes a bearing bush 40 of a nonsettling material, such as steel, aluminum or a light metal alloy, which is press-fitted with oversize into the tube stub 14.

The mounting tube 12 is lengthened via the wiper bearing 36. A fastening bore 58 with openings 60 is located in its extension 38. A coupling element 42 is seated in the fastening bore 58 and protrudes through the openings 60 with a projecting length 44. The fastening bore 58 can be axially parallel with the wiper bearing 36 or can form any arbitrary angle with it.

Figure 4:
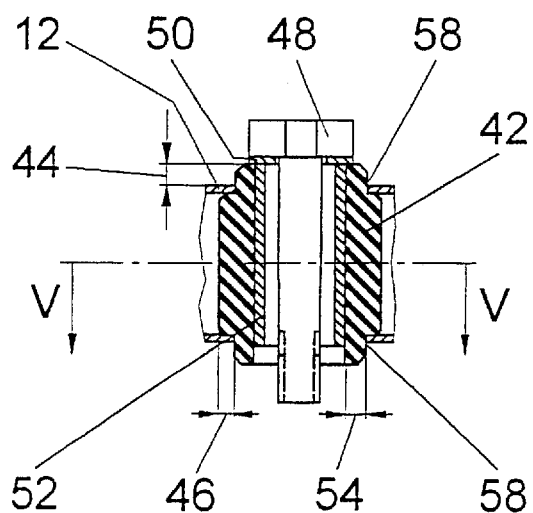
FIG. 4, a fragmentary longitudinal section taken along the line IV—IV of FIG. 2.
Figure 5:
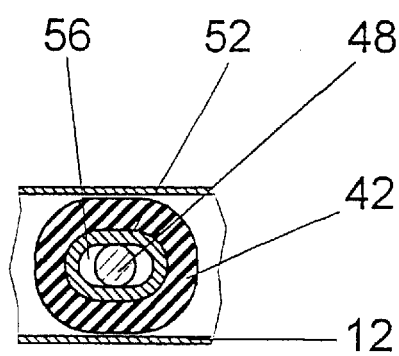
FIG. 5, a fragmentary longitudinal section taken along the line V—V in FIG. 4.

As FIG. 4 shows, the coupling element 42 protrudes axially to both sides with an overlap 46 into the mounting tube 12. The overlap 46 and the projecting length 44 keep the coupling element 42 fixed by positive engagement in the mounting tube 12. The projecting length 44 is selected such that the coupling element 42 has a short structural length, yet with adequate damping and decoupling. The minimum wall thickness 54 of the coupling element 42 should not be less than 2 mm. The projecting length 44 and the overlap 46, which expediently amounts to 1 mm to 2 mm, are adapted to the hardness of the coupling element 42 such that the coupling element can be installed either through the openings 60 of the fastening bore 58 or axially through an open end of the mounting tube 12. The hardness of the coupling element 42 is expediently in the range between 30 and 60 Shore A.

A spacer bush 52 is inserted through the coupling element 42 and has a screw hole 56 of oval cross section for a screw bolt 48 and thus forms an oblong slot, in order to compensate for differences in length between two fastening points. With the screw bolt 48, the tube mounting 10 is solidly screwed to the vehicle body, and in the process the coupling element 42 is compressed. Since the coupling element 42 is in one piece and is guided transversely through the mounting tube 12, it has a large volume, which is well suited for absorbing and damping vibration. The spacer bush 52 serves to limit the initial tension, because it is braced on its face end after a tightening distance and thus absorbs a screw force that is more than the desired initial tension.

A shim 50 is provided between the screw bolt 48 and the coupling element 42 and the spacer bush 52; it overlaps the coupling element 42 and the opening 60 of the fastening bore 58, so that the tube mounting 10 is still secured even if the coupling element 42 should no longer be functional because of aging or damage. However, since for the most part the coupling element 42 is located inside the mounting tube 12, it is especially well protected against environmental factors and damage. The shim 50 can also be formed integrally as a collar onto the spacer bush 52, resulting in a smaller number of parts involved.

The coupling element 42 conforms over a large surface area to the contour of the mounting tube 12. Because of the initial tension, the contacts between the coupling element 42 and the mounting tube 12 is additionally increased, so that the forces can be absorbed over a large surface area with low pressure per unit of surface area, and vibration from frictional events between the coupling element 42 and the mounting tube 12 is effectively damped. The result is accordingly a reliable fastening of the tube mounting 10 that involves only a few parts; the coupling element 42 is simple to preinstall, and even before being installed it is largely protected.

LIST OF REFERENCE NUMERALS

10 Tube mounting
12 Mounting tube
14 Tube stub
16 Tube stub
18 Wiper motor
20 Gear
22 Gear dome
24 Crank
26 Crank
28 Ball peg
30 Ball peg
32 Drive shaft
34 End
36 Wiper bearing
38 Extension
40 Bearing bush
42 Decoupling element
44 Projecting length
46 Overlap
48 Screw bolt
50 Shim
52 Spacer bush
54 Wall thickness
56 Screw hole
58 Fastening bore
60 Opening

What is claimed is:

1. A fastening of a tube mounting (10) for a wiper system on a vehicle body, comprising a mounting tube (12) and a rubber-elastic coupling element (42), the mounting tube having at least one fastening bore (58) extending transversely through the mounting tube, the rubber-elastic coupling element having a hole (56) for a screw received therein and being inserted into the fastening bore (58), the coupling element having a contour conforming to an internal contour of the mounting tube in the region of the fastening bore (58), the coupling element protruding through openings (60) in the fastening bore by a projecting length (44) and overlapping the openings (60) inside the mounting tube on both sides of the coupling element relative to an axis of the coupling element.

2. The fastening of claim 1, wherein the coupling element (42) overlaps the openings (60) for approximately 1 mm to 2 mm in an axial direction of the mounting tube.

3. The fastening of claim 1, wherein the coupling element (42) has a wall thickness (54) of at least 2 mm.

4. The fastening of claim 1, wherein the coupling element (42) has a hardness of approximately 30–60 Shore A.

5. The fastening of claim 1, wherein the screw hole (56) in the coupling element (42) is embodied as an oblong slot in the axial direction of the mounting tube (12).

6. The fastening of claim 1, wherein a spacer bush (52) with a screw hole (56) is inserted into the coupling element (42).

7. The fastening of claim 6, wherein the spacer bush (52) has a collar on one end that overlaps the face end of the coupling element (42) and covers the openings of the fastening bore (58).

* * * * *